No. 653,635. Patented July 10, 1900.
J. ZIMMERMANN.
IMPLEMENT FOR PULLING UP POTATO PLANTS.
(Application filed June 26, 1899.)
(No Model.) 4 Sheets—Sheet 1.
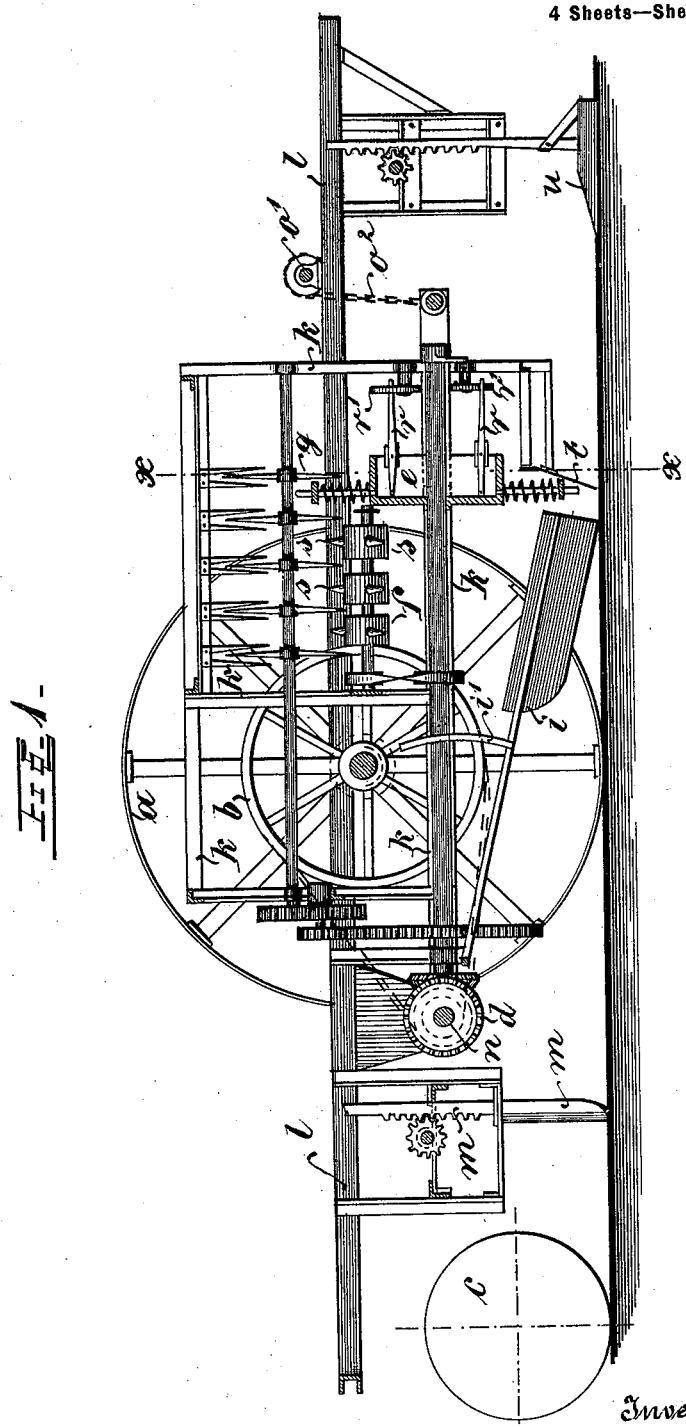

No. 653,635. Patented July 10, 1900.
J. ZIMMERMANN.
IMPLEMENT FOR PULLING UP POTATO PLANTS.
(Application filed June 26, 1899.)
(No Model.) 4 Sheets—Sheet 2.
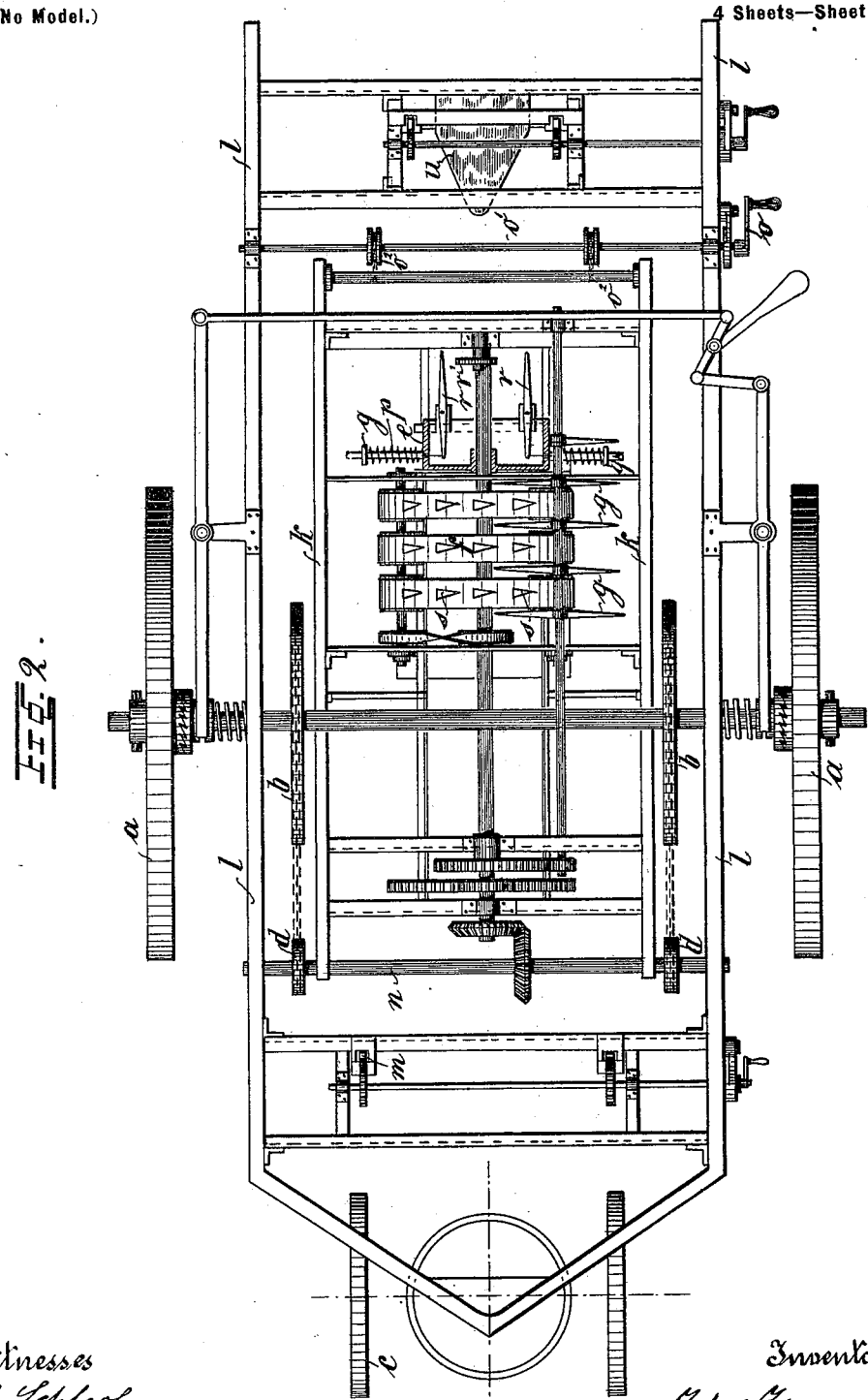

No. 653,635. Patented July 10, 1900.
J. ZIMMERMANN.
IMPLEMENT FOR PULLING UP POTATO PLANTS.
(Application filed June 26, 1899.)
(No Model.) 4 Sheets—Sheet 3.
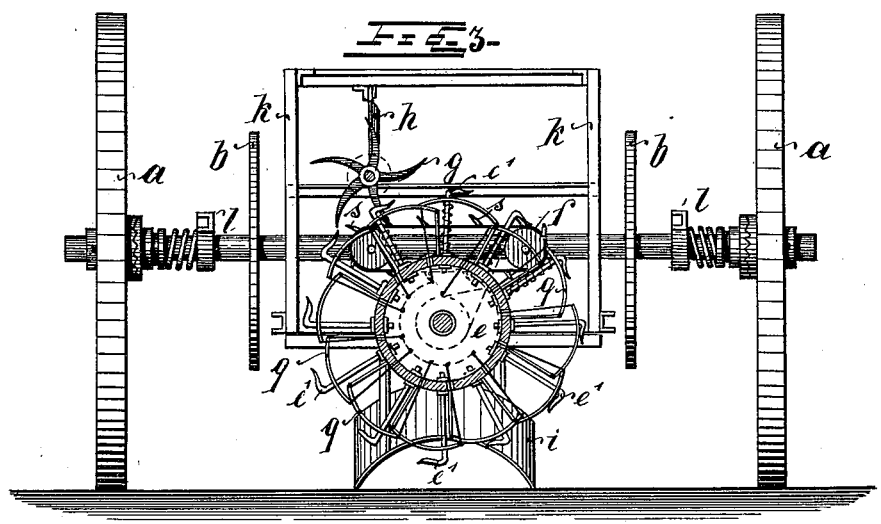
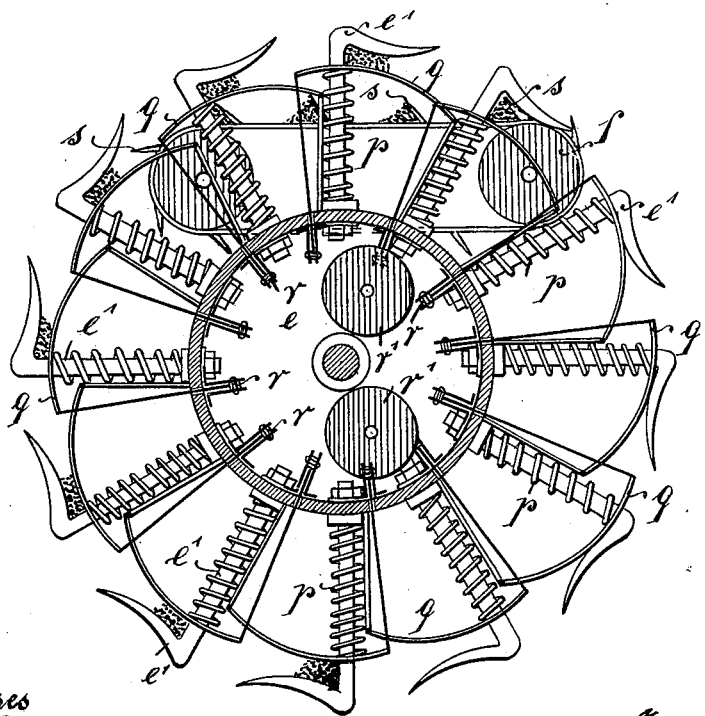

No. 653,635. Patented July 10, 1900.
J. ZIMMERMANN.
IMPLEMENT FOR PULLING UP POTATO PLANTS.
(Application filed June 26, 1899.)
(No Model.) 4 Sheets—Sheet 4.
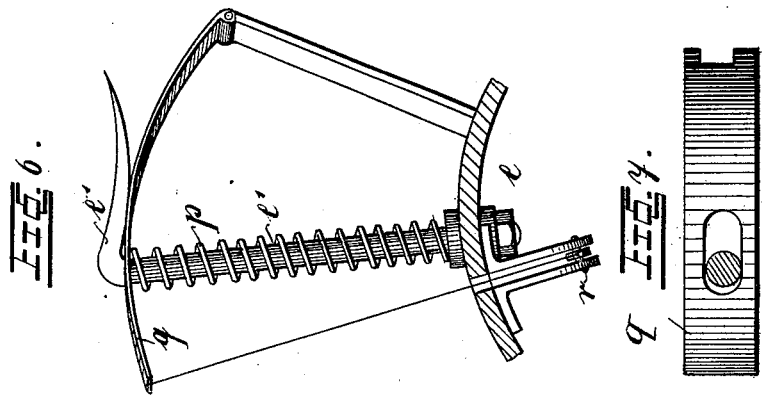
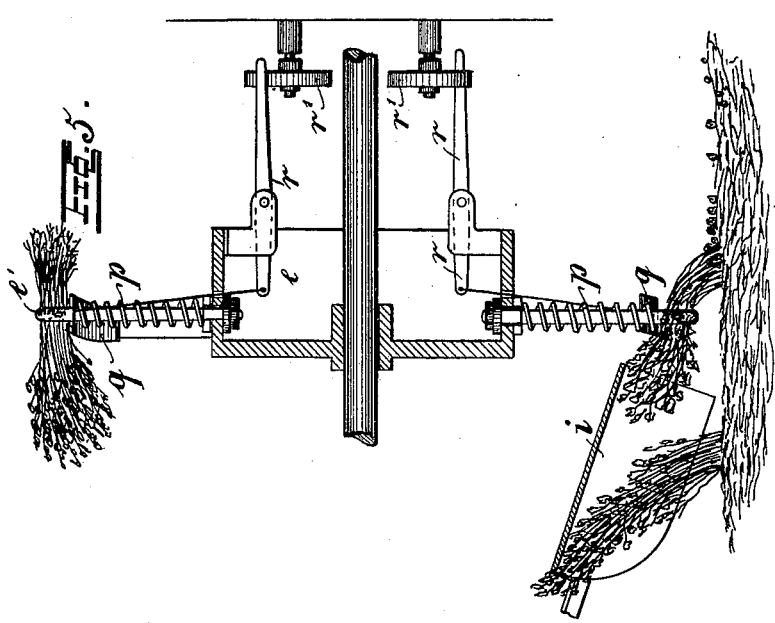
Witnesses
H. Schloss.
Bruno Robra.
Inventor
Jakob Zimmermann
by his Attorneys

UNITED STATES PATENT OFFICE.

JAKOB ZIMMERMANN, OF MUNICH, GERMANY.

IMPLEMENT FOR PULLING UP POTATO-PLANTS.

SPECIFICATION forming part of Letters Patent No. 653,635, dated July 10, 1900.

Application filed June 26, 1899. Serial No. 721,903. (No model.)

*To all whom it may concern:*

Be it known that I, JAKOB ZIMMERMANN, a subject of the King of Bavaria, residing at Munich, in the Kingdom of Bavaria, German Empire, have invented new and useful Improvements in Implements for Pulling Up Potato-Plants, of which the following is a specification.

In using potato-diggers as at present constructed it is found that the removal of the plant presents difficulties and that the device for the purpose impedes the action of the devices for digging and collecting the tubers. According to the present invention this difficulty is obviated by keeping the two operations entirely separate through using two distinct implements.

The implement forming the subject of the present application is only for pulling up the potato-plant, and this operation is carried out preliminary to the use of the implement for digging and gathering the tubers from the rows or hills.

The implement now described consists, essentially, of a device for tearing asunder or separating the plant in order to press the stalks forward, a device for drawing the stalks together into a convenient position, and a wheel to seize them in a bunch by means of a bowed spring, pull them up and transport them to a series of traveling bands provided with teeth, which bring the plant under a cutting device having a set of stationary and of rotating knives. By means of this latter arrangement the plant is chopped up and may be then dispersed. Any tubers which may be lifted with the plant are separated by a rake device below the wheel.

On the accompanying drawings one form of carrying out the invention is shown.

Figure 1 is a longitudinal section of the implement; Fig. 2, a plan view of the same; Fig. 3, a section on the line $x\ x$, Fig. 1; Fig. 4, a rear view, to a larger scale, of the wheel for pulling up the plant, the central case or cylinder being shown in section. Fig. 5 is a vertical cross-section of Fig. 4; Fig. 6, one of the arms of the wheel, separately drawn to a still larger scale and showing the hook and bowed spring. Fig. 7 is a plan view of the latter.

The implement as a whole runs on wheels $a$ and is driven by chain-wheels $b$, mounted on the same axle and engaging with other chain-wheels $d$. The implement is steered by the fore-carriage $c$. On the axle of the wheels $a$ is mounted the main framework $l$, carrying at its front end the vertical adjustable blade device $m$, which forms a preliminary or advance cutter and serves the purpose of tearing the plant apart and bending it over in the direction in which the implement is traveling. Below the framework $l$ is carried a shaft $n$, on which is mounted the frame $k$, carrying the operating device proper. The frame $k$ can be raised and lowered at its rear end by means of a crank $o$, shaft $o'$, and chain $o^2$, whereby the wheel $e$ may be adjusted to the proper height. The frame $k$ also carries the bowed pivotally-mounted presser device $i$, for pressing down the stalks of the plant. This device is carried by lateral arms $i'$, Fig. 1, and presses down the plant by its own weight into the position for the wheel to seize it. This wheel consists of a cylindrical case $e$, having hooks $e'$ secured radially to it and adapted to seize the stalks of the plant pressed down by the presser device $i$, as shown in Fig. 5, and to pull them out and elevate them. On the case $e$ bowed springs $q$ are arranged, pressed outward by the spiral springs $p$ and each having one end connected to a chain or wire fastened to one arm of a lever $r$, Fig. 5, pivoted to the case $e$. These bowed springs $q$ are for the purpose of preventing the plant which has been pulled up from falling down again, so that it may be carried by the hooks $e'$ to a transport mechanism $f$ and there deposited by the bowed springs $q$, being drawn back through the operation of their respective levers $r$. The bowed springs are acted upon twice by the levers $r$ in each revolution of the wheel—that is, on the levers $r$ sliding over the two rollers $r'$, Figs. 4 and 5. Above the wheel are a number of sickle-shaped knives $g$, Figs. 1 and 3, so arranged that they take into the spaces between the traveling bands $f$. Operating with the rotating blades $g$ are other stationary blades $h$, fixed on the main framework in such manner that each blade $g$ comes between two stationary knives $h$.

The operation of the implement is as follows: The plant pulled out of the ground is carried by the wheel through half a revolution, Fig. 4. In this position the bowed spring $q$ under the action of the lever $r$ and roller $r'$ is drawn down and the plant, now free, is caught by the teeth $s$ of the traveling bands, which carry it to the knives $g$ $h$. Here the rotary blades $g$ throw the stalks against the stationary blades $h$, so that they are finely chopped up and may then fall into a collector or (since in this chopped form the stalks can no longer impede the potato-digging machine) may be allowed to drop on the row. Behind the wheel, Fig. 1, a rake $t$ is arranged, by means of which any potatoes pulled up and hanging to the plant are raked off and fall to the ground. At the rear end of the implement there is also a device $u$ for working through the rows or hills, and thus preparing for the subsequent operation of the potato-gatherer.

Having thus described my invention, what I claim as new, and desire to secure by Letters Patent, is—

1. An implement for pulling up potato-plants, comprising a suitable framework $l$ mounted on wheels $a$ $c$ and carrying a device $m$ to separate the plants, and an adjustable frame $k$ on which is pivoted a device $i$ to bend over the plants, said frame having mounted on it a wheel driven by means of suitable gearing from the main axle, provided with hooks $e'$ and a spring device $q$ and operating mechanism $r$ $r'$; in combination with a transporter $f$, and cutting device consisting of rotary blades $g$ coöperating with stationary blades $h$, and a raking device $t$, all substantially as described and for the purposes set forth.

2. In an implement for pulling up potato-plants, a wheel for seizing and raising the plants from the ground comprising a central part or case having radial hooked arms $e'$ and bowed springs $q$ pressed outward by spiral springs $p$ and drawn inward by lever and roller device $r$ $r'$, all arranged and operating substantially as set forth.

In testimony whereof I have signed this specification in the presence of two subscribing witnesses.

JAKOB ZIMMERMANN.

Witnesses:
GUNTON FAMBACHER,
EMIL HENGEL.